(12) United States Patent
Bryant et al.

(10) Patent No.: US 10,540,687 B2
(45) Date of Patent: Jan. 21, 2020

(54) SYSTEMS AND METHODS FOR AUTOMATED MASS MEDIA COMMERCE

(71) Applicant: TTN HOLDINGS, LLC, New York, NY (US)

(72) Inventors: Barry Bryant, Denville, NJ (US); S. Robert Levine, Greenwich, CT (US)

(73) Assignee: TTN HOLDINGS, LLC, New York, NY (US)

(*) Notice: Subject to any disclaimer, the term of this patent is extended or adjusted under 35 U.S.C. 154(b) by 139 days.

(21) Appl. No.: 15/664,394

(22) Filed: Jul. 31, 2017

(65) Prior Publication Data

US 2017/0330229 A1 Nov. 16, 2017

Related U.S. Application Data

(63) Continuation of application No. 13/840,776, filed on Mar. 15, 2013, now Pat. No. 9,747,615, and a
(Continued)

(51) Int. Cl.
*G06Q 30/02* (2012.01)
*G06Q 30/06* (2012.01)

(52) U.S. Cl.
CPC ......... *G06Q 30/0253* (2013.01); *G06Q 30/02* (2013.01); *G06Q 30/0241* (2013.01); *G06Q 30/0267* (2013.01); *G06Q 30/0601* (2013.01)

(58) Field of Classification Search
None
See application file for complete search history.

(56) References Cited

U.S. PATENT DOCUMENTS 5,971,277 A 10/1999 Cragun et al.
6,199,048 B1 3/2001 Hudetz et al.
(Continued)

FOREIGN PATENT DOCUMENTS

JP 2009123073 A 6/2009
KR 20090115108 A 11/2009
(Continued)

OTHER PUBLICATIONS

Supplementary European Search Report for Application No. EP 14765746 dated Oct. 18, 2016.
(Continued)

*Primary Examiner* — Mila Airapetian
(74) *Attorney, Agent, or Firm* — Botos Churchill IP Law LLP

(57) ABSTRACT

Systems and methods for implementing point of advertising purchasing include using mass media publications configured for or containing service, product or vendor transmittable signals, such as from radio frequency identification tags. In a preferred arrangement, a consumer perceiving an advertisement of the mass media publication may activate a reader in a portable communications device, such as a smart mobile or cellular phone, to receive information from the radio frequency signal associated with the advertisement to identify a vendor, product or service associated with the radio frequency identification. The smart mobile phone or communications device of the consumer may communicate with a system of a vendor or vendors by way of a commerce data organization system across a network to order a product or product information from a system of the vendor over the network by using the information from the radio frequency identification.

20 Claims, 10 Drawing Sheets

Related U.S. Application Data continuation of application No. 13/841,000, filed on Mar. 15, 2013, now Pat. No. 9,747,612, said application No. 13/840,776 is a continuation-in-part of application No. 13/673,424, filed on Nov. 9, 2012, now Pat. No. 8,781,911, said application No. 13/841,000 is a continuation-in-part of application No. 13/673,424, filed on Nov. 9, 2012, now Pat. No. 8,781,911, which is a continuation of application No. 13/172,122, filed on Jun. 29, 2011, now Pat. No. 8,315,914, which is a continuation of application No. 12/780,053, filed on May 14, 2010, now Pat. No. 7,991,644, which is a continuation of application No. 10/987,823, filed on Nov. 12, 2004, now Pat. No. 7,739,150.

(60) Provisional application No. 60/552,472, filed on Mar. 12, 2004.

(56) References Cited

U.S. PATENT DOCUMENTS

| | | |
|---|---|---|
| 6,435,406 B1 | 8/2002 | Pentel |
| 6,535,726 B1 | 3/2003 | Johnson |
| 6,577,861 B2 | 6/2003 | Ogasawara |
| 7,065,559 B1 | 6/2006 | Weiss |
| 2002/0094787 A1 | 7/2002 | Avnet et al. |
| 2002/0138347 A1 | 9/2002 | Sakata |
| 2002/0156677 A1 | 10/2002 | Peters et al. |
| 2002/0169686 A1 | 11/2002 | Zweben et al. |
| 2002/0169714 A1 | 11/2002 | Ike et al. |
| 2002/0178014 A1 | 11/2002 | Alexander |
| 2003/0006911 A1 | 1/2003 | Smith et al. |
| 2003/0061110 A1 | 3/2003 | Bodin |
| 2003/0070167 A1 | 4/2003 | Holtz et al. |
| 2003/0097302 A1 | 5/2003 | Overhultz et al. |
| 2004/0029569 A1 | 2/2004 | Kahn et al. |
| 2004/0049451 A1 | 3/2004 | Berardi et al. |
| 2004/0083170 A1 | 4/2004 | Bam et al. |
| 2004/0128197 A1 | 7/2004 | Bam et al. |
| 2004/0158488 A1 | 8/2004 | Johnson |
| 2004/0172340 A1 | 9/2004 | Bishop et al. |
| 2004/0186768 A1* | 9/2004 | Wakim ............ G06Q 30/02 705/14.27 |
| 2004/0189635 A1 | 9/2004 | Hoisko |
| 2004/0230536 A1* | 11/2004 | Fung ............ G06Q 20/382 705/64 |
| 2004/0243519 A1 | 12/2004 | Perttila et al. |
| 2005/0182648 A1* | 8/2005 | Shaw ............ G06Q 30/02 705/1.1 |
| 2005/0203914 A1 | 9/2005 | Bryant et al. |
| 2007/0203796 A1 | 8/2007 | Riggs |
| 2011/0137715 A1 | 6/2011 | O'Shea et al. |
| 2011/0145046 A1 | 6/2011 | Lopez Logrono |
| 2011/0320247 A1 | 12/2011 | Bryant et al. |
| 2012/0054002 A1 | 3/2012 | Rotbard et al. |
| 2012/0084811 A1 | 4/2012 | Thompson et al. |
| 2012/0218084 A1 | 8/2012 | Arponen et al. |
| 2012/0226603 A1 | 9/2012 | Smargon |
| 2013/0006733 A1 | 1/2013 | Fisher |
| 2013/0066692 A1 | 3/2013 | Bryant et al. |
| 2013/0066695 A1 | 3/2013 | Just |
| 2015/0234636 A1 | 8/2015 | Barnes, Jr. |

FOREIGN PATENT DOCUMENTS

| | | |
|---|---|---|
| WO | 01/61458 A1 | 8/2001 |
| WO | 2007101078 A1 | 9/2007 |

OTHER PUBLICATIONS

International Search Report and Written Opinion for Application No. PCT/US2014/028649 dated Jun. 27, 2014.

International Search Report and Written Opinion for Application No. PCT/US2014/028117 dated Jul. 8, 2014.

"Advertising to Track Commericals Digitally; Top U.S. Networks will comply with a system seen as comparable to the bar-scanning code"; Los Angles Times; Business; Business Desk; Aug. 18, 2004.

* cited by examiner

SYSTEMS AND METHODS FOR AUTOMATED MASS MEDIA COMMERCE

CROSS REFERENCE TO RELATED APPLICATIONS

This application is a continuation of U.S. patent application Ser. Nos. 13/840,776 and 13/841,000 both filed Mar. 15, 2013, which are each a continuation-in-part of U.S. patent application Ser. No. 13/673,424 filed Nov. 9, 2012, which is a continuation of U.S. patent application Ser. No. 13/172,122 filed Jun. 29, 2011, and issued as U.S. Pat. No. 8,315,914 on Nov. 20, 2012, which is a continuation of U.S. patent application Ser. No. 12/780,053 filed May 14, 2010, and issued as U.S. Pat. No. 7,991,644 on Aug. 2, 2011, which is a continuation of U.S. patent application Ser. No. 10/987,823 filed Nov. 12, 2004, and issued as U.S. Pat. No. 7,739,150 on Jun. 15, 2010, which claims the benefit of the filing date of U.S. Provisional Patent Application No. 60/552,472 filed Mar. 12, 2004, the entire disclosures of which are hereby incorporated herein by reference.

FIELD OF THE TECHNOLOGY

The present technology relates to wireless commerce systems. More particularly, the technology involves a point of advertising wireless commerce system to enable pervasive commerce with mass media publications.

BACKGROUND OF THE TECHNOLOGY

Traditionally, vendors of services and product utilize mass media to advertise their products. Thus, a vendor will publish an ad describing service or products in magazines, catalogs, billboards, newspapers, radio or television broadcast publications. The advertisement is aimed at attracting the interest of a potential consumer. However, in order to move beyond the stage of advertising, much effort is required by the consumer.

The consumer typically has to either remember advertised information if any interest in an advertised product or service will be pursued by the consumer. In the situation where an advertisement includes contact information such as a telephone number, a consumer can dial the phone number to contact a vendor from information in the advertisement using a telephone, wireless or cellular phone. But the amount of effort that is required by the consumer from the point of advertisement to consummation of an actual purchase from the vendor can work against the vendor. Consumers can easily forget telephone numbers, URLs or other calls to action or simply lose interest in an advertised product or service as time goes by after the consumer recognizes the advertisements.

SUMMARY OF THE TECHNOLOGY

The technology relates to an automated system for improving the way consumers respond to advertisements or otherwise contact vendors from the point of perceiving an advertisement. In one form, a system for processing a wireless order from a vendor over a network from a mass media publication includes a mass media publication with an advertisement. The mass media publication has a wireless identification transmission signal representing information of the advertisement. In the system, a mobile ordering device comprising a reader receives the wireless identification transmission signal from the mass media publication. The mobile ordering device is also configured to accept input from a consumer, generate a request with information from the wireless identification transmission signal and communicate the request to and receive a response from a vendor system across a network. The system also includes a vendor system for receiving and processing the request of the mobile ordering device across the network, and responding to the request by sending information to the mobile ordering device. The sent information is associated with the wireless identification transmission signal from the mass media publication.

The technology also involves a method for making a wireless order from a consumer to a vendor over a network from a mass media publication. The consumer reviews a mass media publication with a perceivable advertisement. The mass media publication includes a wireless transmission identification signal representing information about a vendor or product associated with the advertisement. The consumer may initiate receipt of the wireless transmission identification signal with a portable communications device configured to receive the wireless transmission identification signal. The consumer may then generate a request for information from a vendor over a wireless link of a communications network with the portable communications device such that the request includes information from the wireless transmission identification signal. The consumer then receives a response to the consumer request from the vendor over the wireless link of the communications network at the portable communications device to get additional information about the product or confirm a purchase made in the request.

The technology also may involve a hand-held apparatus for making a wireless order from a consumer to a vendor over a network from a mass media publication. The apparatus includes a transceiver for transmitting and receiving wireless signals for communicating with a vendor system over a network. The apparatus also includes a reader device configured to read vendor or product information transmitted from a mass media publication containing a radio frequency identifier with the vendor or product, the radio frequency identifier being associated with an advertisement of the mass media publication. A control processor of the apparatus, coupled to the transceiver and reader device, is configured for accepting input by a user of the apparatus to initiate reading of the radio frequency identifier of the mass media publication with the reader device. The control processor further generates a request for information about the vendor or product with the radio frequency identifier and communicates the request to the vendor system with the transceiver. The control processor also controls receiving a response with information from the vendor system.

In another form, the technology includes a method for taking a wireless order from a consumer by a vendor over a network from a mass media publication. A vendor advertises a product or service in a mass media publication. The mass media publication is configured with a radio frequency identifier with information associated with the product or service advertised. The radio frequency identifier is readable by a portable wireless communications device available to a consumer. The vendor configures a vendor system to receive an electronic order from a consumer across a network using the portable wireless communications device. The order is based on a request with information from the radio frequency identifier. The vendor system includes further product or service information associated with the radio frequency identifier. The vendor then can respond to the orders from the consumer by providing the further information to the consumer.

In another form, the technology includes a method for dynamically and automatically generating responses to consumer wireless orders. A commerce data organization system may access supplemental condition data to tailor the response and thus permit varying responses to the same request sent on behalf of different users. In addition, the response may be customized based on consumer benefit bidding or vendor benefit bidding, in which case the response may vary depending on the value of the consumer benefit and/or the advertising fee paid by the vendor.

In yet another form the technology includes an automated method and system for responding to a consumer's wireless request for a service or product offered by a vendor. The wireless request is associated with a human-perceptible advertisement. The advertisement is associated with an RFID transmitter that transmits a wireless transmission identification signal representing information pertaining to the service or product offered by the vendor.

The system and method involve receiving an electronic consumer request at a commerce data organization system from a wireless ordering device. The commerce data organization system then generates a response associated with information pertaining to the product or service and further associated with supplemental condition data. The supplemental condition data permits varying responses to electronic consumer requests. An example response may include a plurality of vendors proximate to a geographic location of the wireless ordering device.

The supplemental condition data may be received in whole or in part from the wireless ordering device. The supplemental condition data may comprise vendor inventory data, vendor traffic data, shipping cost data, shipping time data, customer referral incentive offer data, item popularity data, payment account identification data, consumer transaction history data, consumer affinity data, vendor geographic proximity data, or wireless ordering device geographic location data. The supplement condition data may also comprise data derived from tracking and maintaining: dates and times of customer information requests, vendor's locations, customer purchases, customer account information.

The technology also involves generating a response based on selecting from a plurality of vendor bids. The selection may be based on the one with the lowest consumer value, the bid with the highest vendor fee or the bid that has the lowest consumer price and a highest vendor fee.

In one form, the mass media publication is a printed publication having at least one radio frequency identification tag for identifying a vendor or product. However, many such identifications or tags may be used for different vendors or products. The mass media publication may also be a billboard, periodical, magazine, mailer or a post card, etc. having one or more radio frequency identifiers or RFID tags. In a preferred form, the mobile ordering or consumer communications device is also a mobile, wireless, cellular and/or "smart" telephone equipped for voice and data communication.

Additional aspects of the technology will be apparent from a review of the drawings, the following disclosure, and the claims.

DETAILED DESCRIPTION

Figure 1:
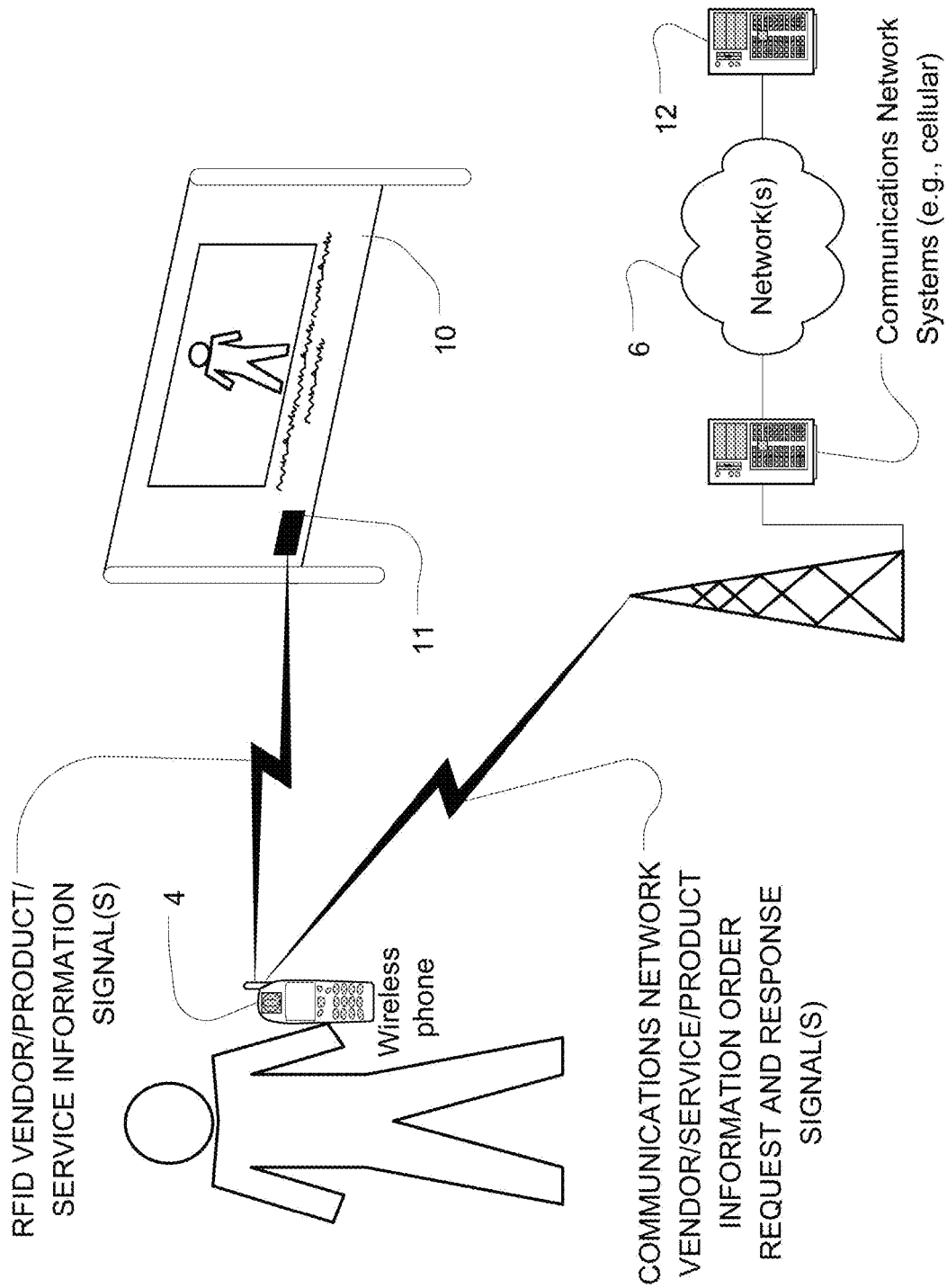
FIG. 1 is a representation of a consumer with a preferred point of advertising wireless ordering device receiving vendor product identification signals transmitted from a billboard mass media publication.

Referring to the figures, where like numerals indicate similar features, a point of advertising ordering system 2 for electronic commerce typically includes a wireless ordering device 4 that is preferably accessible to a mobile consumer, such as a laptop, hand held or palm computer, a personal data assistant (PDA) or other programmable input/output processing device such as a smart mobile phone, wireless phone or cellular telephone. The consumer accessible point of advertising ordering device 4 is configured for connection or networking to other systems or computers via one or more communications mechanisms for purposes of ordering information or products and services from one or more vendors. While such communication links may in part be implemented as a physical connection such as a telephone line, cable or contact based (e.g., cradle) hook-up, in a preferred embodiment, the ordering device 4 at least includes a communications mechanism that can link the device to other systems via a wireless communications channel.

For example, the device may be configured for Wireless Fidelity (WiFi®) networking (wireless networking), Bluetooth® networking (wireless networking) and/or communications over a mobile telephone network for transmitting data and/or voice with a transceiver (e.g., General Packet Radio Service (GPRS) or other radio service network). Where such networked communications involve transfer of signals or messages over one or more network(s) 6 that includes an open-type network, such as an internet or the Internet, preferably such signals or messages are encrypted. As will be described in more detail herein, the wireless ordering device 4 also preferably includes a reader mechanism for determining vendor, product or service information from a mass media publication 4.

The point of advertising ordering system 2 also includes a mass media publication 10 configured for transmitting product, service and/or vendor information signals associated with an advertisement of the mass media publication 10. Preferably, the mass media publication transmits such information by means of radio frequency identification technology (RFID). For example, RFID technology, such as ultra thin transponder tags 11, may be inserted, applied or incorporated into the mass media publication and associated with a human perceivable advertisement of a vendor, product or service. The RFID includes information to identify a vendor, product and/or service (i.e., commerce information). Preferably, the vendor, product and/or service may also be contained in, presented or described in the advertisement. In the RFID tag example, transmission of vendor, product and/or service information or commerce signals may be active or passive.

The RFID transmission may be any low energy or close vicinity or proximity wireless communication such as active or passive tags, transmitters or transceivers. The transmission may include a particular number or numbers that may be associated with particular vendor, product and/or service information, such as a vendor name, vendor contact information including, for example, a phone number, network address, mailing address or other, quantity information, cost, price, type of product, type of service, etc. Thus, when used to request or order information or make a purchase, the number transmitted in the signal may be used to access the related information stored in a database as will be explained in more detail herein.

Figure 2:
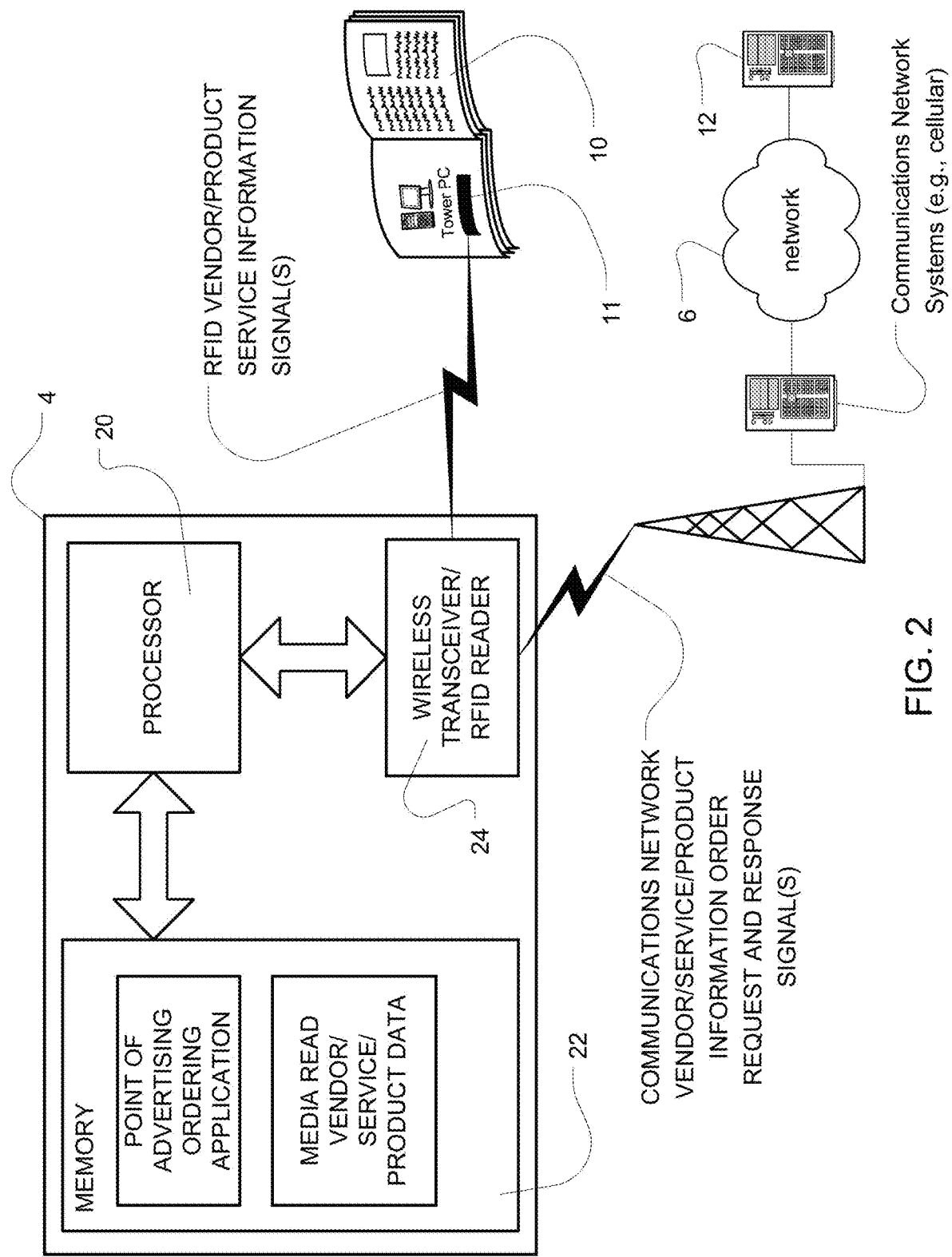
FIG. 2 is a representation of a preferred point of advertising ordering application in a wireless ordering device.
Figure 3:
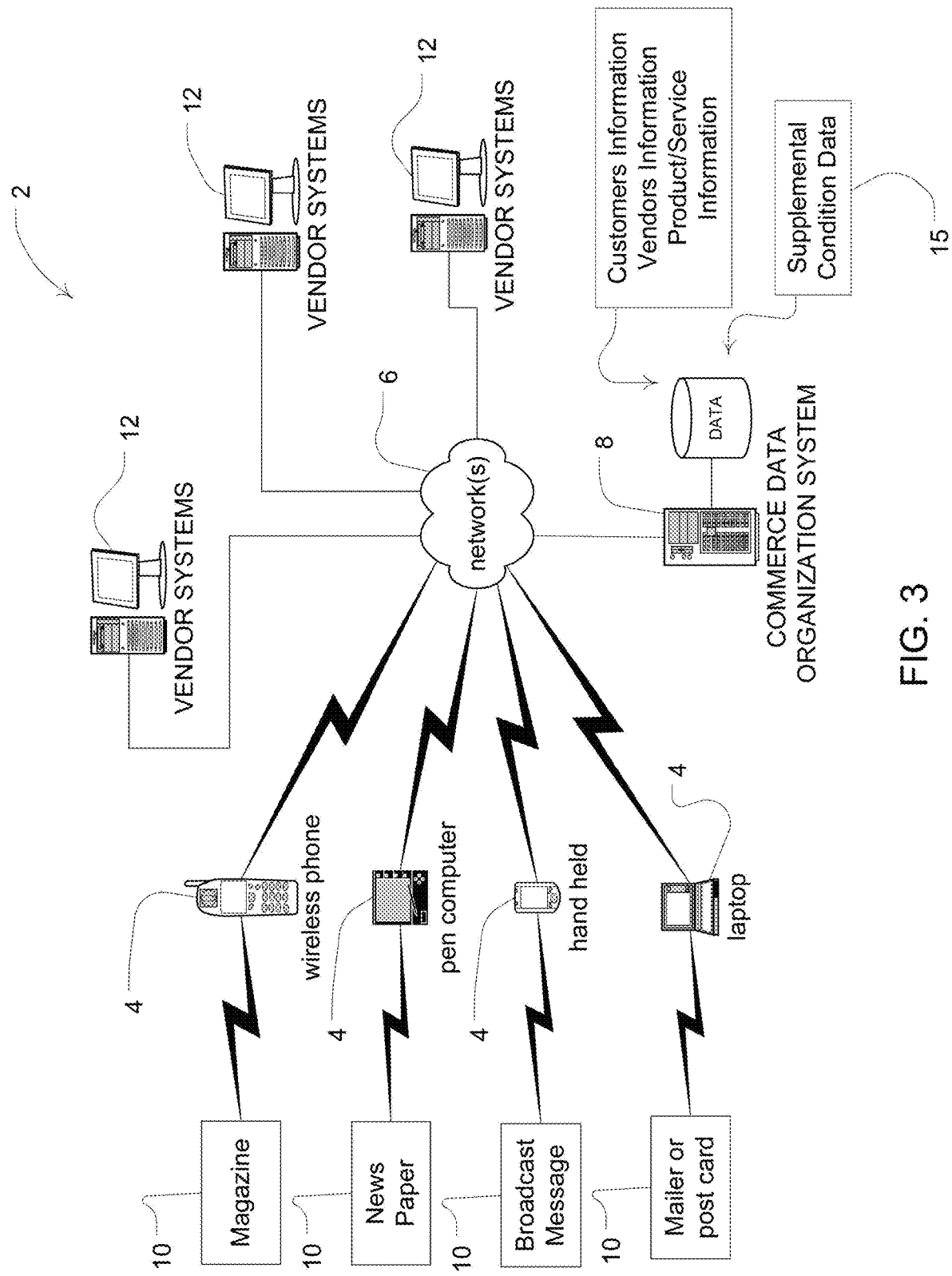
FIG. 3 is a network diagram of an example embodiment including preferred components of a wireless mass media commerce system including a point of advertising ordering device.

As illustrated in FIGS. 1 to 3, examples of the mass media publication containing RFID and other advertisement may be a magazine, news paper, periodical, mailer, post card, outdoor or out-of-home media, billboard, bus shelter poster board, car card, tent card, catalog or a broadcast message such as a radio or television communication, whether transmitted via wireless transmission (e.g., radio transmissions or satellite) and/or cable transmission in whole or in part. For example, a magazine may include one or more RFID tags with each associated with a particular product, service or vendor. Each tag may be located near a human perceivable advertisement in the magazine. In another example, a radio or television connected by cable, satellite or otherwise, may be equipped or attached with a re-programmable tag or device that may be changeable for re-transmitting different RFID's from the tag or device depending on the content of the broadcast signals received by the radio or television and the tag or device.

A vendor may be any entity that provides communication for a consumer service or commerce transactions. A vendor may, for example, be a manufacturer, advertiser, retailer or all of the above. In certain cases a vendor benefits from automated media commerce as both the advertiser and retailer.

In general, the point of advertising ordering system 2 may also include commerce related systems such as one or more vendor systems 12. Generally, the vendor system 12 is accessible by the network 6 and may be associated with an advertisement contained in a mass media publication 10 as well as the associated commerce signal enabled by the mass media publication 10. It is preferred that the vendor system 12 be enabled for receiving or processing requests for vendor/product/service information and responding to them. Thus, in a typical arrangement, the commerce system 12 may electronically receive an order for more information or an actual purchase order over the network 6 and send back responses concerning these transactions in response to a transaction initiated by a consumer with a wireless ordering device 4.

The vendor system would typically include one or more servers coupled by communications device(s) to the network 6 and would include application software for accessing information in a database associated with vendor products or services and communicating with systems over the network. The one or more servers embody the vendor's information architecture and may include an advertising media content server, a customer service database, customer relationship management database, or consumer loyalty and rewards systems.

As illustrated in FIG. 3, the commerce system of the technology may also optionally include a commerce data organization system 14. The commerce data organization system can serve to organize transactions over the network based on vendor/product/service or other commerce facilitating signals from a mass media publication 10. Generally, the commerce data organization system 14 may manage information associated with the commerce signals. Thus, a database or other storage structure of one or more servers of the commerce data organization system 14 may include vendor information including contact details for electronically accessing a vendor system 12 over a network. Similarly, such vendor information may include product and service description or details about a product or service that may be advertised in the wirelessly enabled mass media publication 10 and particularly associated with commerce signals transmittable from or in the mass media publication 10. Like the vendor servers, the commerce data organization system would typically include a communications device for communicating with other systems and devices over the network (6).

Such a commerce data organization system 14 may also be utilized to preserve and organize transaction details concerning requests for information or purchases (i.e., order information) based on requests generated by a wireless ordering device 4 with commerce signals emanating from the wirelessly enabled mass media publication 10. Thus, the system may track or maintain product availability from different vendors or different vendor's locations, customer purchases or information requests and buying habits, dates and times of such transactions, product/service options, payment methods etc. Such a system may even be utilized to maintain account information (e.g., credit or cash card numbers), shipping address information, etc. for purchases by consumers to minimize repeated entry of such data by the consumer with a wireless ordering device 10. The commerce data organization system 14 may include an authentication module to verify user accounts, vendor accounts, wireless ordering devices and vendor systems. This allows the commerce data organization system to function as a Trusted Service Manager (e.g., trusted intermediary). This may involve acting as a neutral broker that provides end-to-end security. By individually authenticating the users and the vendors, they may transact with one another in a secured manner although neither has authenticated directly to the other.

Authentication of a user or vendor account may involve passwords, user names/avatar, or biometric data. Authentication of a device may involve managing security keys as well as require probing the device to confirm the software or hardware has not been compromised (e.g., payment software was replaced with a malicious version).

The commerce data organization system 14 may electronically act to arrange a purchase through the network 6 by communicating with another vendor system 12 in the event that an electronic purchase order is received from a wireless ordering device 4. Alternatively, such a purchase may be placed between the wireless ordering device 4 and the vendor system 12, while the commerce data organization system serves to preserve data of such transactions and/or provide access to data for such transactions based on requests with or for information received from either the vendor system 12 or wireless ordering device 4. Optionally, the commerce data organization system may also act as a vendor system 12.

As illustrated in FIG. 3 the commerce data organization system 14 may also include supplemental condition data 15. The commerce data organization system 14 may employ the supplemental condition data 15 as input for automatically and intelligently generating dynamic responses to RFID based transactions. The supplemental condition data 15 may include, for example, price data, shipping cost data, shipping time data, vendor traffic data, vendor bid data, vendor inventory data, consumer interest data (e.g., wish list), offer expiration and details data, retail season data, item expiration data, item detail data, service description data, item popularity data, payment account data, coupon data, gift card data, brand/vendor credit card data, identification data, customer referral incentive offer data, consumer transaction history data, or geographic proximity data which may include current and past geographic location data of the wireless ordering device, vendor geographic location data and RFID tag geographic location data.

Supplemental condition data may also include vendor or consumer affinity data. Affinity data may relate to a customer or vendor aligning with a social cause or being socially responsible. This may relate to a philanthropic or charitable organization (e.g., Breast Cancer Research Foundation), cause marketing (e.g., breast cancer awareness), a public service announcement, corporate social responsibility, social welfare incentive (e.g., sustainability), or community interest (e.g., supporting locally grown goods, or ethically traded products).

Affinity data may also relate to a consumer's prior relationship with a specific vendor. This may include data concerning the existence of a payment account, rewards card, past purchases or a partnership. Alternatively, the affinity data may be based on the similarity of a vendor with another vendor that already has an established relationship with the consumer.

Figure 8:
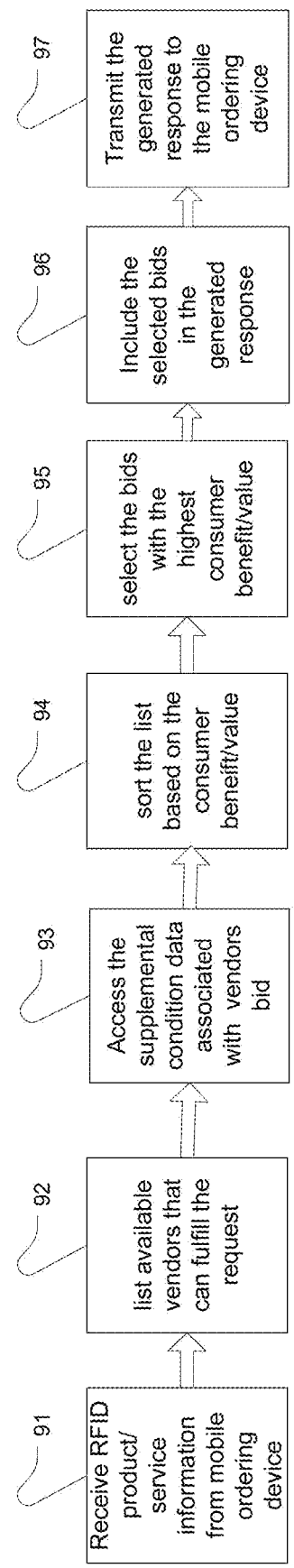
FIG. 8 is a flow chart of example steps for generating a response that vendor bids.

Supplemental condition data may also include consumer transaction history data, which may include the types of products purchased, or favorite brands. It may also include the consumer's action or inaction in response to past advertisements, such as merely viewing the details as opposed to actually purchasing a product or service. It may also take into account whether a prior order was cancelled or returned. The commerce data organization system 14 may generate a response based on the supplemental conditional data using a system of bidding. The bidding may be consumer benefit bidding or vendor benefit bidding or a combination of both. Consumer benefit bidding generates a response that selects bids based on value to the consumer. The value may be calculated by analyzing a variety of supplemental condition data. For example, the system may take into account price data, vendor and consumer affinity data, and/or geographic location in assigning a value to a vendor. Alternatively, the system may increase or decrease the value, or eliminate a vendor based on any supplemental data. For example, a vendor that sets aside a portion of the purchase price for a customer supported social cause may have an increased value. In addition, if the consumer has a gift card, a vendor credit card with a lower interest rate, or a coupon it may affect the value. The flow chart of FIG. 8 illustrates an embodiment of the consumer benefit bidding. In step 91 the commerce data organization system receives the RFID based information from the wireless ordering device. In step 92 the system then identifies the vendors that are able to fulfill the request, such as for a consumer product. In step 93 the system accesses the supplemental condition data for the vendors bid. This supplemental condition data may be directly accessible by the commerce data organization system (e.g., in local database). Alternatively, accessing supplemental condition data may include real time contact or negotiation with a vendor system. Next, the system may sort the vendor bids based on value, as discussed above, and select the bids with the highest value as seen in steps 94 and 95. The system then includes these bids in the generated response, which is sent to the wireless ordering device as seen in steps 96 and 97.

Vendor benefit bidding is different from consumer benefit bidding because the former selects bids based on the fee a vendor will pay to have their response transmitted to the wireless ordering device. This fee is not necessarily related to the price that the consumer will pay for the item. Rather this may be the advertisement fee paid by the vendor to have its advertisement transmitted and/or placed in a better position when sent to a potential customer. This fee may be a fixed fee per response or may depend on the size or time of the response, or the keywords or content of the request. When using the vendor benefit bidding the commerce data organization system first determines the available vendors that can fulfill the request. It may then sort a list of determined vendors based on the vendor fee and select the bids with the highest vendor fee. The selected bids are then included in the generated response, which is sent to the wireless ordering device.

In some cases, the commerce data organization system may generate a response by selecting bids based on a combination of consumer benefit bidding and vendor benefit bidding. This may result in the selection of a bid that has a high consumer value, which benefits the consumer, yet still maximizes the profit potential for the commerce data organization system by choosing bids with a higher advertisement fee. When using this dual selection mechanism the commerce data organization system first executes the consumer benefit bidding discussed above to select a group of bids that have the same consumer value or are within a narrow range of values. It then sorts this group using the vendor benefit bidding discussed above to select the subset of the group that has the largest vendor fee. It then includes this subset in the generated response, which is sent to the wireless ordering device.

In other cases the commerce data organization system 14 may generate a response taking into account the value as discussed above, but may emphasize, for example, providing the product in the shortest amount of time. For purchases to be made in person or for in-store pickup this may require generating a response with geographically proximate vendors. If a consumer wishes to purchase a product in-person, the commerce data organization system 14 may access the geographic location of the wireless ordering device and compare it to the geographic locations of known vendors. This allows the system to calculate which vendor can be reached in the least amount of time. This calculation may be based only on the distance between the current location of the wireless ordering device and the location of the vendor. Alternatively, it may take into account the projected route and/or transportation modality (e.g., walking, automobile, subway or boat) of the consumer and select a vendor that is closest to the consumer's route. The projected route and/or mode of transportation may be based on geographic tracking of the mobile ordering device or assisted by the user.

In an alternate embodiment the system may use the geographic location of the advertisement (e.g. RFID transponder) instead of the geographic location of the wireless ordering device. In this case, the advertisement location may act as a proxy for the location of the wireless ordering device. This allows the response to include geographically proximate vendors without accessing the geographic location data of the user or wireless ordering device, which may be restricted due to privacy concerns.

The geographic location of the advertisement may be maintained by the commerce data organization system. This may be done by providing each advertisement with RFID information in the RFID tag or transmitter that may be associated with a specific geographic location. Thus, if there are many instances of an identical advertisement (e.g., multiple smart posters), they may be configured such that each instance of the advertisement has an unique RFID tag. The correlation between the RFID's unique ID and its geographic location may be known to the advertiser, vendor, or a third party and may be accessed by the commerce data organization system via the push or pull method described below.

Figure 5:
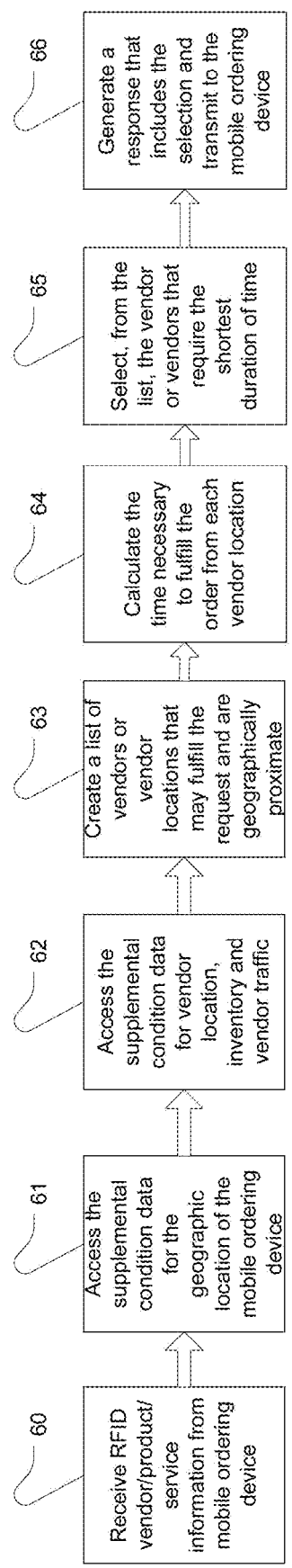
FIG. 5 is a flow chart of example steps for generating a response that includes geographically proximate vendors.

The flow chart in FIG. 5 illustrates an example embodiment of a method for detecting the geographically proximate vendors. In step 60, the system (e.g., commerce data organization system) receives the RFID information from the wireless ordering device. In step 61, the system accesses the supplemental condition data for the geographic location of the wireless ordering device. In step 62, the system may access the supplemental condition data for the vendor, which includes the vendor's geographic location, its inventory and the vendor traffic (e.g. lines at checkout). The supplemental condition data may accompany the request or be accessed by a push or pull method discussed below. In step 63, the system creates a list of vendors or vendor locations that are able to fulfill the request and are geographically proximate.

In step 64, the system calculates the time necessary to fulfill the request for each vendor. The system may employ the geographic distance as well as other variables that will affect time, such as supplemental condition data relating to the vendors traffic, (e.g., checkout lines). By considering this, the system may select a vendor location that is farther away if the checkout wait time is shorter, and thus would minimize the total time required to fulfill the request. The system then selects the vendor or vendors from the list that require the shortest duration of time and includes this in the generated response, which is then transmitted to the wireless ordering device, as seen in steps 65 and 66.

If the consumer opted to make the purchase online the commerce data organization system 14 may look to different supplemental condition data to select a vendor that can provide the product in the least amount of time. For example, the commerce data organization system 14 may emphasize the shipping time and weight it higher than price and geographic proximity. The shipping time may be based on the consumer's current geographic location, the consumer's home address or an alternate address input by the consumer. It may also reference existing inventory to check if the item will be backordered. If product is available it may look to the supplemental condition data that estimates how long it takes to package and prepare the item for shipping.

Figure 6:
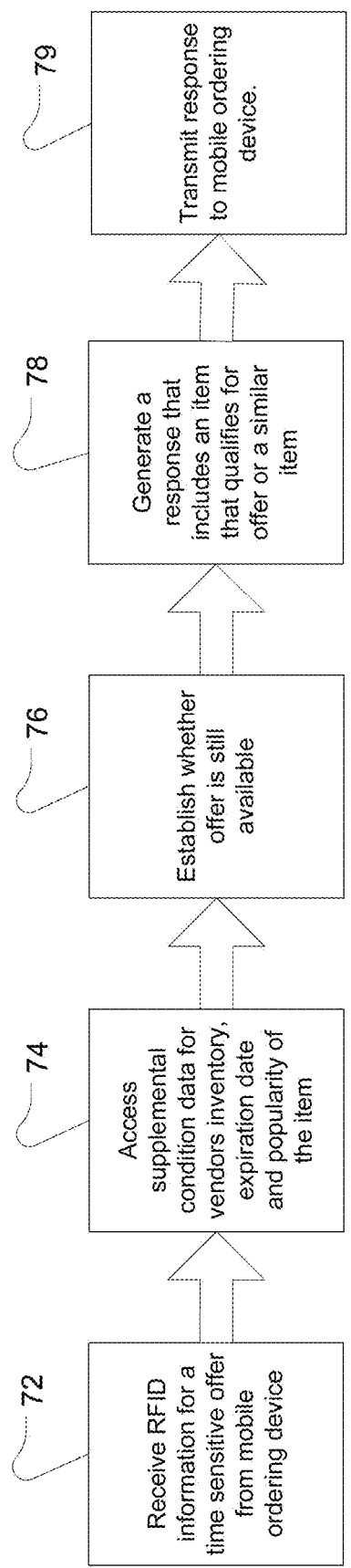
FIG. 6 is a flow chart of example steps for generating a response that includes a time sensitive offer for a perishable item.

In some cases, the commerce data organization system may generate a response that evaluates the value discussed above but emphasizes a vendor's time sensitive offer (e.g., while supplies last or an offer on perishable goods or simply a time limited offer). This embodiment is illustrated in the flow chart of FIG. 6. In this situation, a wireless ordering device may submit a request for information concerning a time sensitive offer, as seen in step 72. The commerce data organization system may then reference the supplemental condition data associated with a vendor to establish the inventory of goods and the duration of the offer, as seen in step 74. The system may also take into account the popularity of an item to establish whether the item is still available or available at a future date. The commerce data organization system 14 can generate a response as seen in step 78 that highlights items that qualify for the time sensitive offer or suggest others that have a similar value. It may then transit the response to the wireless ordering device 79.

Figure 7:
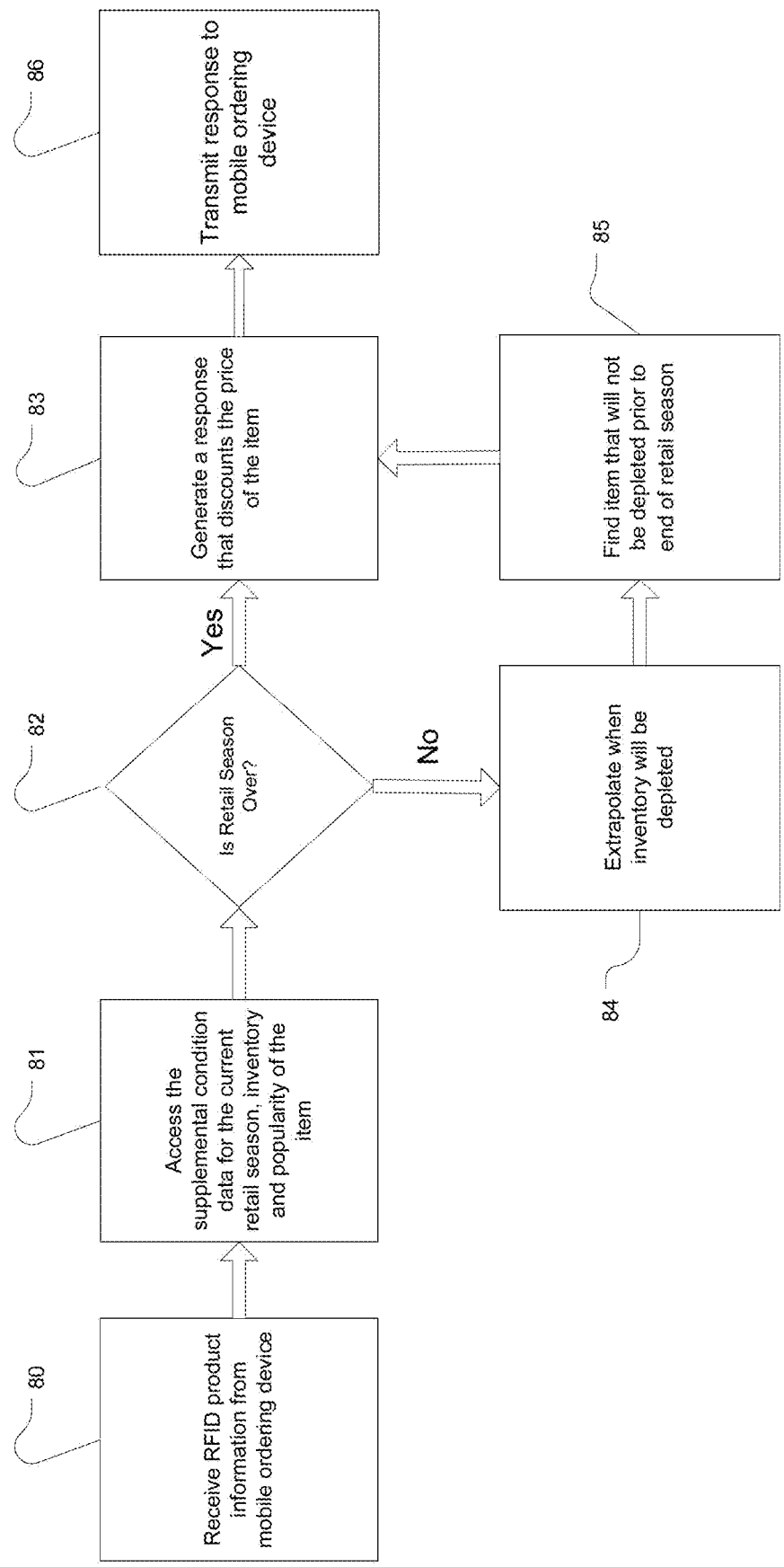
FIG. 7 is a flow chart of example steps for generating a response that includes overstock liquidation.

In an alternative scenario, the commerce data organization system 14 may generate a response that takes into account overstock liquidation. This embodiment is illustrated in the flow chart of FIG. 7. The commerce data organization system may reference the supplemental condition data relating to the current retail season, inventory or popularity of the item. The commerce data organization system 14 may first estimate the duration of the existing retail season and compare it to the current date, as seen in steps 81-82. If the retail season has ended it may discount the price of the goods, as seen in step 83, or list the good higher in the list of products returned. If the season has not yet ended it may analyze the current inventory and popularity of the item to extrapolate when the inventory will be depleted, as seen in step 84. If depletion is not expected to occur within the current retail season the system may take appropriate steps to incentivize consumers to purchase the goods (e.g., decrease price) as seen in step 83.

In some cases, the commerce data organization system 14 may access and/or evaluate the supplemental condition data to automatically generate a response that can be tailored to the specific consumer that submits the request. For example, an advertisement might not display a particular product or local retail vendor, such as in the case of an advertisement having a brand of a manufacturer. In such cases, when the wireless ordering device transmits a request related to an RFID associated with the advertisement, the request might not have a specific vendor (e.g., local retailer) or product but may be brand associated. The tailoring of the response may then be based, in whole or in part, on consumer affinity data, consumer transaction history data or any other supplemental condition data discussed above. For example, in some cases the advertisement may be associated with a brand with many different products that are sold by multiple retail vendors. In such a case the commerce data organization system may evaluate the supplemental condition data to choose which vendor or vendors would be most beneficial to the customer. (e.g., a highest value to the consumer, such as a store at which the consumer frequents, has an account and/or has a store rewards program). In some cases, the commerce data organization system will analyze the supplemental condition data to select a particular product or products that might be most beneficial to the particular customer such as suggesting a particular product for the consumer of the advertised brand that would be most suitable for the consumer.

A response generated by the commerce data organization system 14 may contain multiple products or vendors and not just a single product or vendor. For example, the commerce data organization system 14 may identify a plurality of vendors that are proximate to the geographic location of the wireless ordering device. Alternatively, it may select a single vendor but list multiple locations affiliated with that vendor for one product. In some cases it may respond with multiple products of one vendor. Whether to respond with such multiples entries may be based on a preconfigured setting, dynamically decided by the commerce data organization system 14 or selected by the consumer.

The supplemental condition data 15 may originate from a variety of sources. Some of the supplemental condition data may be passively tracked during the processing of prior requests, as discussed above. Alternatively, the supplemental condition data may be received from the vendor system or wireless ordering device. In this case the information may be either retrieved by the commerce data organization system 14 or it may be pushed by either the vendor system or wireless ordering device. The commerce data organization system 14 may retrieve the supplemental data by making an outgoing request to retrieve the information. The vendor system or wireless ordering device then responds to the commerce data organization system to provide the information requested. This information may reside in local storage of the wireless ordering device or vendor system or may require the system or device to prompt its user to input data. Pushing, on the other hand, requires either the vendor system or wireless ordering device to initiate contact with the commerce data organization system 14 to provide additional supplemental data or update existing supplemental data. This latter pushing approach may be configured to provide real time updates of the supplemental condition data.

The supplemental condition data may also be a parameter configured by the consumer, vendor, advertiser or an affiliate or partner. For example, the consumer may select or enter favorite retailers and/or causes. The configurable data may also in part be contained in the RFID of an advertisement. As a result, a vendor may disseminate supplemental condition data embedded with the advertisement. For example, when the RFID of an advertisement is read, the data may be loaded onto the wireless ordering device. At that point, it may accompany the consumer request or may reside in cache or local storage to be subsequently retrieved or pushed to the commerce data organization system.

As illustrated in more detail in FIG. 2, the wireless ordering device 4 generally includes a processor 20 and memory 22 with processor control instructions and/or other microcontroller or other application specific electronic control circuitry. The ordering device also includes one or more wireless transceiver circuit(s) 24. Such circuit(s) may serve as the communications mechanism for purposes of ordering information or products and services from one or more vendors as well as the reader mechanism for determining vendor, product or service information from a mass media publication 4. Such transceiver circuit(s) 24 may be incorporated into the wireless ordering device 4 or attachable or insertable as expansion modules, cards or components of such a device, for example, by coupling with or into a wireless phone, PDA or laptop. Preferably, such transceiver circuit(s) 24 is/are incorporated to permit the wireless ordering device 4 to serve with the communications mechanism and reader mechanism as a compact unit for hand-held operation.

Consistent with the mass media publication's 10 incorporation of RFID information, the reader mechanism is at least a wireless reader capable of or configured for receiving and decoding vendor, service or product identification information from the mass media publication. Thus, the wireless ordering device 4 may include an RFID reader for receiving wireless signals from a mass media publication 10 utilizing RFID technology. Optionally, in the case of passive RFID technology, the reader mechanism may be equipped to activate a transmission of RFID information from the mass media publication 10 by transmitting signals to an RFID tag of the mass media publication 10, for example, to power the RFID tag to transmit RFID information to the reader mechanism.

Preferably, such components of the wireless ordering device 4 are used in conjunction with implementing functionality of a point of advertising ordering application 26 of the wireless ordering device 4. One such preferred methodology of such an application is illustrated in the flow chart of FIG. 4.

Figure 4:
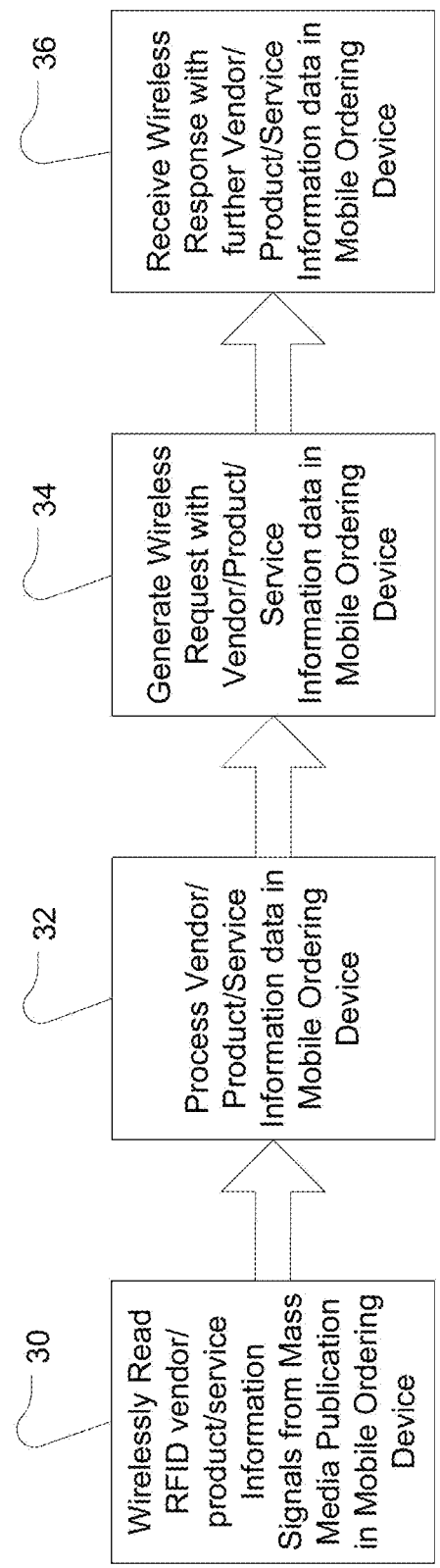
FIG. 4 is a flow chart of preferred steps for achieving a wireless mass media commerce system.

Generally, a consumer with a wireless ordering device 4 may review a mass media publication 10, such as the magazine or periodical publication illustrated in FIG. 2 or billboard of FIG. 1. As previously discussed, the mass media publication 10 includes a mechanism for transmitting commerce related signals such as RFID information. As illustrated in FIG. 4, in a reading step 30, the RFID information is received from the mass media publication preferably by wireless communication, which may be initiated by an input command of the consumer on the wireless ordering device 4. In a processing step 32, the point of advertising ordering application 26 will then process the read RFID information on the wireless ordering device 4 depending on input of the consumer. Thus, a consumer may input into the wireless ordering device 4 that more information about a vendor, product or service perceived in an advertisement of the mass media publication 10 should be requested. Optionally, such input may indicate a request to purchase that which is being perceived by the consumer in the advertisement of the mass media publication.

Once the device reads the RFID information, in a generating step 34, the point of advertising ordering application controls the wireless ordering device 4 to generate a wireless request that includes the RFID information. The request is preferably transmitted from the wireless ordering device 4 over the network(s) 6 to a vendor system 12 and/or the commerce data organization system 14 as previously described. Such a transmitted request may include a user identification associated with a particular consumer or a particular wireless ordering device 4. Additional transmitted request information may include password or pass code, form of payment information, media location or media description (e.g., identifiers describing the mass media publication from which the commerce signal is received.) This information may be coded (e.g., a number being associated with a name) such that it will be recognized by the vendor system 12 and/or the commerce data organization system 14 upon access of their database or other data storage structures.

In return from the vendor system 12 and/or commerce data organization system 14, the wireless ordering device 4 will receive vendor, product or service information associated with the commerce signal read by the wireless ordering device 4 advertised in the mass media publication 10. Thus, the consumer may, for example, learn by display of information on the wireless ordering device 4, additional information about an advertised product or confirm a purchase from a vendor. For example, the vendor system 12 and/or the commerce data organization system 14 may generate an email confirmation receivable by the wireless ordering device 4.

While the above process has been described by a single request and response between the wireless ordering device 10 and the vendor system 12 and/or the commerce data organization system 14, multiple electronic requests and responses between these systems/devices may be implemented to accomplish transactions contemplated by the system. For example, additional requests and/or responses may be transmitted to confirm that a consumer will proceed with a particular purchase so that the details of the purchase may be confirmed before purchase by the consumer such as reviewing shipping details, product quantity, price or other details etc. that may be related to such transactions.

The disclosure of U.S. patent application Ser. No. 13/841,000, with Title "Systems and Methods For Automated RFID Based Commerce Rewards", filed on Mar. 15, 2013, is incorporated herein by reference in its entirety.

The commerce data organization system 14 may also manage a rewards or incentive program. Thus, it may maintain rewards account data and rewards rules for crediting or debiting value to the accounts. This program may include providing rewards for sharing information about an advertisement or purchase. The rewards are designed to incentivize consumers to engage with RFID associated media and share and publish their media experiences. The rewards may be based on a system of points, discounts, rebates, coupons or a combination of any or all of them. The points system accumulates points (e.g., reward points, loyalty points, affiliate-based points, bonus points) that are then associated with a user's account. The points may operate as a virtual currency where they may be redeemed for reward items, which may include vendor gift cards, merchandise, services and/or trips. Discounts and rebates may be instantly effective on a current purchase or capable of being used for a future purchase of the same item or a different item. As discussed below the rewards may be transferred to another user, entity or cause either manually or automatically.

Sharing messages concerning an advertisement or past or prospective purchase is one way to accumulate rewards. The advertisement may be anything described above, which includes identifying a brand, product or service. These may be aligned with a social purpose, such as a public service announcement, a philanthropic organization, cause marketing, social welfare incentive or community interest that may be identified by the advertiser or vendor as a corporate social responsibility initiative.

The shared message may contain text, images, video, audio or other form of multimedia communication. In addition to or as an alternative, the RFID information described herein may be included in the message. For example, the message may include unique element of RFID information (e.g., reward code, advertiser or vendor ID, RFID code segment, or unique identifier) that may attribute the message to the advertisement and/or RFID transmitter it originated from so that the sharing of the message may be tracked. In addition, the message may include information associated with the user who shared the message. This may be the original sharer and/or a subsequent sharer. This may also be used for attribution and crediting, to be discussed below.

Sharing may be done through any form of social media. Social media refers to the means of interactions among people in which they create and exchange information and ideas in virtual communities and networks. The message may be shared by using social media tools. A social media tool may be various online and software tools that allow users to communicate via a network such as the Internet and share information and resources. This includes the social media server and server side components, as well as the social media client and client side components (e.g., smart phone applications, etc.). Typical social media tools include: social networking systems (e.g., Facebook, Google+, Myspace, LinkedIn); blogs and micro-blogs (e.g., Twitter); web feeds (e.g., news feeds or RSS feeds); virtual storefronts (e.g. Ebay, Etsy); content sharing tools, which may include tools to share pictures (e.g., Flickr, Pintrest) or for sharing videos (e.g., Youtube); and tools that support more direct communication, such as email, text messaging (SMS), and MSM messaging.

Figure 9:
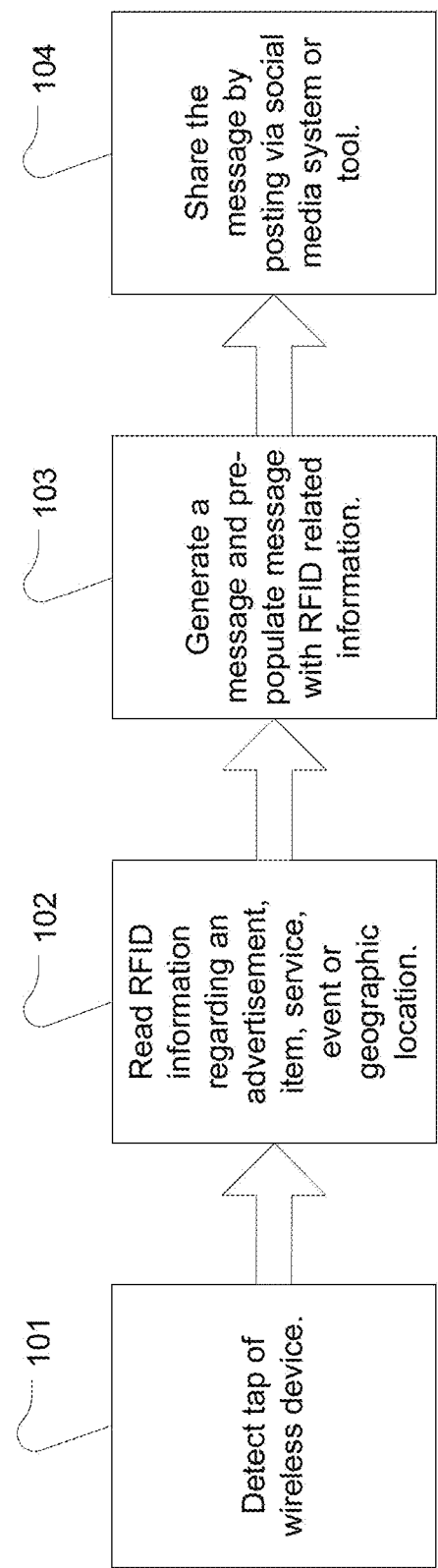
FIG. 9 is a flow chart of example steps for tap initiated sharing.

The wireless ordering device or commerce data organization system may include mechanisms to ease or automate sharing. One such system is tap initiated sharing, which is illustrated in the flow chart of FIG. 9. The method of tap initiated sharing may include step 101 where the wireless device detects that it has been tapped against an advertisement or in close proximity to the advertisement. The tap may be a coupling of the wireless device with a region of an advertisement or RFID transmitter associated with an advertisement. The action involved in initiating sharing may be based on a further user input such as shaking of the mobile ordering device, or a hand gesture, such as a touch, press or swiping finger across a screen or bezel. Thus, the wireless mobile device may have a sensor module. The sensor module may be an accelerometer, gyroscope, or a tactile sensor sensitive to force, pressure or touch.

In step 102, the mobile ordering device reads the RFID. The transmission of the RFID information may be performed in the same manner as discussed above. The RFID transmission may be followed by further transmission such as wireless transmission based on the information stored in the RFID transmitter (e.g., tag). For example, the RFID may contain a Uniform Resource Locator (URL), or information for referencing or linking to additional information. This additional information may be a static file on a server or may be dynamic information on a server or web site. The information may cause the wireless device to respond in a customized manner, for example, to launch a browser or activate a specific software application or service (e.g., Twitter or Facebook).

After reading the RFID information, the wireless ordering device may perform step 103, which involves generating a message to be shared. This step may prompt the user of the wireless ordering device to create a message. The prompt may be in the form of an audio, visual or tactile alert. In response to the prompt, the user may create a message using textual input, for example, by using actual keys or soft keys. User may also use audio input via speech recognition to create the message. Alternatively, the wireless ordering device may generate a pre-populated or partially populated message based on information associated with the RFID. As discussed above this may be the information contained by the RFID or any information related to the RFID (e.g., linked via URL) or associated with the RFID in a database of a server such as the commerce data organization system. In an alternate embodiment, the message generation step may be completely automated with no user interaction. This may allow a wireless ordering device that lacks a keyboard or graphic user interface to be able to post shared messages.

Once the message has been generated, it may be shared in step 104. Sharing may be performed by the wireless ordering device and/or the commerce data organization system and may involve communication with a social media server. This may optionally involve the user to be prompted for permission to share or to insert credentials (e.g., user name, password, biometric data, or other authentication information). This aspect may be automated if the user's credentials have been preconfigured. Once authorized, the sharing of a message may be performed by using any of the message sharing tools discussed above.

In some cases, the sharing may be done sequentially. For example, one user may publish a shared message based on the RFID tag, and then a subsequent user may then republish by re-sharing the message or a new message concerning the product or advertisement without having direct access to the RFID tag.

In some cases, the sharing may be triggered by a purchase such as a purchase based on an RFID transmission with the mobile ordering device. The message may be shared when a purchase is initiated or when it is completed.

In a further embodiment, the sharing may be triggered based on checking into a geographic location. For example, a user may attend a charity event and upon a check-in procedure by the wireless device, such as by an RFID tap with an entry point to the event, the wireless device may share a message. This message may associate the user of the wireless device with the event and/or its cause, such as by demonstrating the user's support for the cause. In addition, the tap may result in rewards being credited to a user by a sponsor. Such rewards may, at the user's option, be automatically donated to the cause, such as by transfer of the value of the reward to an account associated with the cause.

In addition to sharing messages, a user may accumulate rewards based on a completed purchase. As discussed previously the commerce data organization system may be configured to track and maintain information concerning purchases based on RFID transmissions. When tracking the purchases the system may associate rewards points with one or more purchases. The purchase may be any purchase involving a good or service. The purchase may be completely automated or may be initiated by a user interaction. The user interaction may be as simple as initiating an RFID transmission with a wireless ordering device.

Once a consumer transaction (e.g., purchase and/or request for information concerning an RFID associated advertisement) or an act of sharing that qualifies for rewards occurs, the system may calculate the amount of a reward based on a set of programmed rules. Calculating the reward amount may depend on how the advertiser or vendor would like to reward the transaction. This may depend on whether the transaction was a purchase or based on message sharing. For a purchase, the reward may depend on the price of the completed purchase, the number of purchases, the type of purchase (e.g., gas, food, flights). For sharing, the reward may depend on who is posting the message. This may be based on the demographics of the user sharing, such as age, gender, occupation. It may also depend on the user's breadth of contacts (e.g., social influence), such as the number of connected users (e.g., friends or followers) or the geographic extent of the distributed connections. It may also depend on the user's reputation in the community, years of experience, community rank, or prestige. It may also depend on the content of the message. For example, was the message's viewpoint positive or negative, or was there an in-depth review of the product or service or did it merely include an item and price.

When calculating a reward the system may analyze the reactions of other users to the shared message. This may be based on the audience reached by the message, such as the number of unique users that view the message or the number of times each user views the message or a combination of both to derive the total number of views. The reward may also be based on how other users respond to the message, such as commenting on the message or "liking" the message. There may also be additional rewards if another user subsequently purchases the item or re-shares the message (e.g., a re-post or re-tweet).

Once a reward has been calculated, the system may then credit the user. Crediting a user reward may include attributing the reward to a user and/or also transferring a reward value to the user account. Alternatively the user may be given attribution but have the reward points transferred to benefit a social cause (e.g., donated to a charity account) or a third person (e.g., friend or family member account). The transfer may include all of the reward or only a percentage and may occur automatically or be designated by the user.

Crediting a user may involve modifying a user account associated with the user of the wireless ordering device. This account may exist with the commerce data organization server or on any system described above or linked therewith. In some cases the account may exist with a third party server, such as a media sharing network, affiliate network, partner network, online network, developer network, content distribution network, or transaction network. In such cases, the commerce data organization server may typically communicate with the server that manages the account to provide a quantity of a reward or provide data necessary for the server to determine an amount of a reward.

In some cases, rewards may be provided by the operator of the rewards system infrastructure described herein or may be paid directly by a vendor of a brand being advertised or purchased, or by an affiliate or partner. Alternatively, the rewards may be credited by the rewards system but then reimbursed by the other party.

Figure 10A:
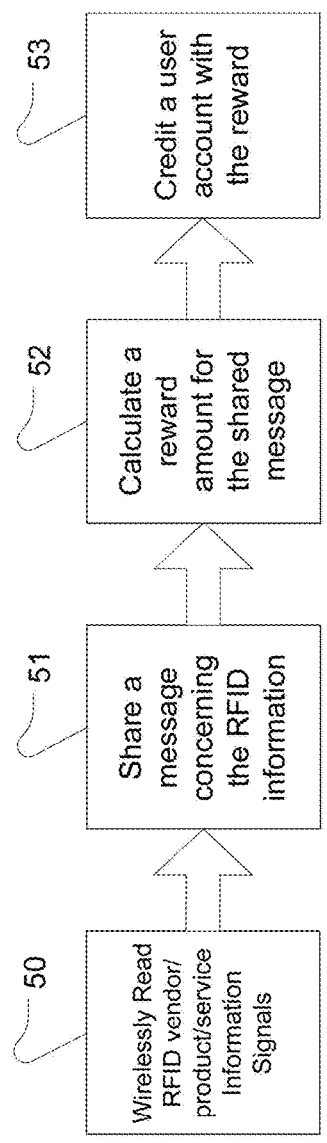
FIG. 10A is a flow chart of example steps for a consumer transaction reward system.

The flow chart of FIG. 10A illustrates an example methodology of a rewards system based on sharing messages. The method may begin with step 50, where the system wirelessly reads RFID information of the vendor, product or service information, such as from an advertisement. The system then shares a message associated with the RFID information in step 51. The system may then calculate a reward amount for the shared message and credit a user account as seen in steps 52 and 53.

Figure 10B:
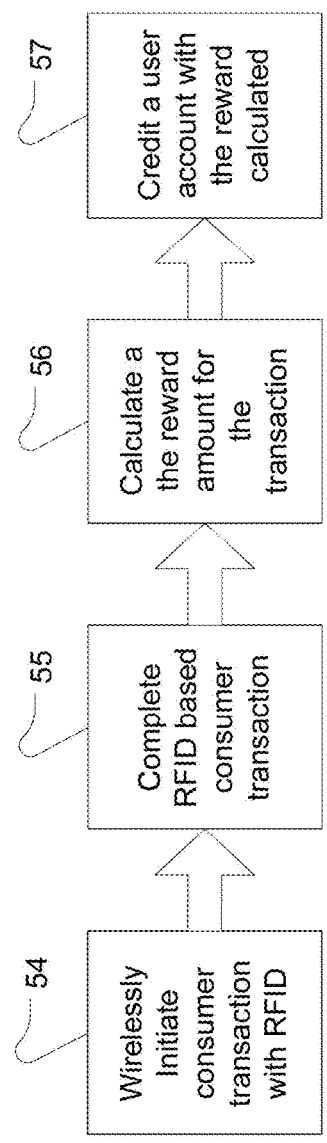
FIG. 10B is a flow chart of example steps for sharing based reward system.

The flow chart of FIG. 10B illustrates an example methodology of a rewards system based on a completed consumer transaction. The method may begin with step 54, where the system wirelessly initiates a consumer transaction using RFID. When the consumer transaction is completed in step 55, the system calculates a reward amount for the consumer transaction in step 56. The system then credits a user account with the reward in step 57.

Figure 10C:
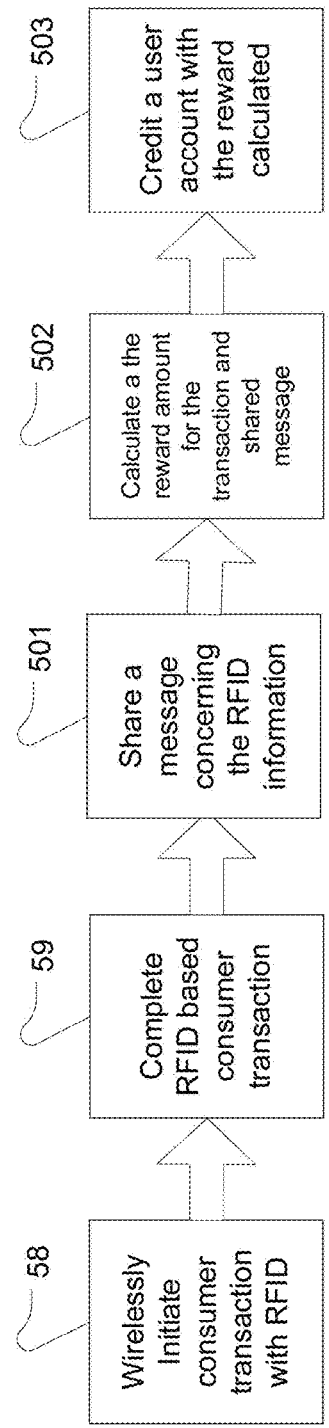
FIG. 10C is a flow chart of example steps for a reward system based on a consumer transaction and sharing.

The flow chart of FIG. 10C illustrates an example methodology of a rewards system based on a completed consumer transaction and the sharing of a message. The method may begin with step 58, where the system wirelessly initiates a consumer transaction using RFID. When the consumer transaction is completed in step 59, the system then shares a message associated with the RFID information in step 501. It then calculates a reward amount for the consumer transaction and/or a reward amount for the shared message in step 502. The system then credits a user account with the reward in step 503.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method for responding, over a communication network, to a wireless request from a consumer to an advertiser, the wireless request associated with a human-perceptible advertisement of a service offered by a vendor, the advertisement associated with at least one transmitter and associated with a wireless transmission identification signal representing information pertaining to the service offered by the vendor, the wireless transmission identification signal being transmitted from the transmitter associated with the advertisement and received at a wireless ordering device of the consumer, the method comprising:

receiving an electronic consumer request at a commerce data organization system from the wireless ordering device via the network, the electronic consumer request having electronic information pertaining to the service offered by the vendor received by the wireless ordering device by way of the wireless transmission identification signal from the transmitter associated with the advertisement;

analyzing supplemental condition data to select a particular product or products offered by the vendor that might be beneficial to a particular customer associated with the wireless ordering device, the supplemental condition data to permit varying responses to electronic consumer requests with the wireless transmission identification signal from the transmitter, generating a response to the electronic consumer request in a processor of the commerce data organization system, the response being associated with the received electronic information pertaining to the service offered by the vendor at the wireless ordering device, the response further associated with the supplemental condition data of the commerce data organization system and provided over the network to the commerce data organization system, the response further comprising information pertaining to the selected product or products; and sending the response to the electronic consumer request by providing, to the wireless ordering device via the network, the information associated with the information pertaining to the service offered by the vendor read from the transmitter with information indicating the selected product or products for displaying of the information indicating the selected product or products on the wireless ordering device.

2. The method of claim 1 wherein the supplemental condition data is received in part from the wireless ordering device.

3. The method of claim 1 wherein the supplemental condition data comprises vendor inventory data.

4. The method of claim 1 wherein the supplemental condition data comprises customer incentive offer data.

5. The method of claim 1 wherein the supplemental condition data comprises coupon data.

6. The method of claim 1 wherein the supplemental condition data comprises proximity data.

7. The method of claim 1 wherein the supplemental condition data comprises wireless ordering device geographic location data.

8. The method of claim 1 wherein the supplemental condition data comprises consumer transaction history data.

9. The method of claim 1 wherein the supplemental condition data comprises affinity data.

10. The method of claim 1 further comprising tracking information requests based on the signals emanating from transmitters, the supplemental condition data comprising data derived from the tracking.

11. The method of claim 10 wherein the tracking comprises maintaining dates and times of customer information requests.

12. The method of claim 1 further comprising, receiving at the commerce data organization system, a purchase request for at least one of the product or products from the wireless ordering device and wherein the commerce data organization system completes a purchase transaction for the one of the product or products.

13. The method of claim 12 further comprising, crediting a value to an account in response to the purchase transaction.

14. The method of claim 13 wherein the crediting involves a virtual currency.

15. The method of claim 13 wherein the crediting is based on sharing of an electronic message.

16. The method of claim 12 wherein the commerce data organization system electronically arranges for completion of the purchase transaction as an intermediary.

17. The method of claim 12 wherein the commerce data organization system electronically completes the purchase transaction with a maintained payment method.

18. The method of claim 12 wherein completing the purchase transaction comprises authenticating one or more of a user and a vendor.

19. The method of claim 18 wherein authentication of a user comprises biometric authentication.

20. The method of claim 1 wherein the transmitter is a transponder.

* * * * *